United States Patent
Paulsen et al.

(10) Patent No.: US 8,846,224 B2
(45) Date of Patent: Sep. 30, 2014

(54) HIGH POWER SECONDARY BATTERY SYSTEM COMPRISING ASYMMETRIC CHARGED CELLS

(75) Inventors: Jens M. Paulsen, Chungcheongnam-do (KR); Songhun Yoon, Daejeon (KR); Hong-Kyu Park, Daejeon (KR)

(73) Assignee: LG Chem, Ltd. (KR)

( * ) Notice: Subject to any disclaimer, the term of this patent is extended or adjusted under 35 U.S.C. 154(b) by 244 days.

(21) Appl. No.: 12/917,631

(22) Filed: Nov. 2, 2010

(65) Prior Publication Data

US 2011/0135972 A1    Jun. 9, 2011

Related U.S. Application Data

(63) Continuation of application No. 12/445,510, filed as application No. PCT/KR2007/005043 on Oct. 16, 2007, now abandoned.

(30) Foreign Application Priority Data

Oct. 16, 2006 (KR) .......................... 10-2006-0100095

(51) Int. Cl.
| | |
|---|---|
| H01M 12/00 | (2006.01) |
| H01M 16/00 | (2006.01) |
| H01M 4/50 | (2010.01) |
| H01M 4/583 | (2010.01) |
| H02J 7/00 | (2006.01) |
| B60K 1/00 | (2006.01) |
| B60K 6/20 | (2007.10) |
| H01M 10/44 | (2006.01) |

(52) U.S. Cl.
CPC ............ *H01M 10/441* (2013.01); *H02J 7/0013* (2013.01); *Y02E 60/12* (2013.01)
USPC ....... 429/9; 429/224; 429/231.95; 429/231.8; 320/116; 180/65.1; 180/65.21

(58) Field of Classification Search
USPC ............. 429/231.1, 221, 223, 9, 224, 231.95, 429/231.8; 180/65.8, 65.1, 65.21; 320/125, 320/152, 116
See application file for complete search history.

(56) References Cited

U.S. PATENT DOCUMENTS

| | | | | |
|---|---|---|---|---|
| 5,703,464 | A | * | 12/1997 | Karunasiri et al. ........... 320/125 |
| 5,705,915 | A | * | 1/1998 | Douglas et al. ............... 320/152 |
| 5,903,131 | A | | 5/1999 | Sekine et al. |
| 6,054,840 | A | | 4/2000 | Nakanishi et al. |
| 6,057,670 | A | * | 5/2000 | Sink et al. ...................... 320/117 |
| 2003/0117109 | A1 | | 6/2003 | Trepka |
| 2003/0198866 | A1 | | 10/2003 | Tanjou et al. |
| 2005/0156566 | A1 | * | 7/2005 | Thorsoe et al. ............... 320/116 |
| 2005/0266150 | A1 | * | 12/2005 | Yong et al. ........................ 427/58 |
| 2006/0216600 | A1 | * | 9/2006 | Inagaki et al. ............. 429/231.1 |
| 2007/0026315 | A1 | | 2/2007 | Lampe-Onnerud et al. |
| 2007/0166607 | A1 | | 7/2007 | Okada et al. |

FOREIGN PATENT DOCUMENTS

| | | |
|---|---|---|
| EP | 1921705 A2 | 5/2008 |
| JP | 09-180768 | 7/1997 |
| JP | 09308013 A | 11/1997 |
| KR | 10-0581200 B1 | 5/2006 |
| WO | 0054359 A1 | 9/2000 |

OTHER PUBLICATIONS

"Circuit Connections", The Physics Classroom, Retrieved online on Mar. 21, 2012 from: http://www.physicsclassroom.com/class/circuits/u9l4a.cfm.*

"Designing a multichemistry battery charger", Texas Instruments Inc. 2009, retrieved online on Mar. 21, 2012 from: http://www.ti.com/lit/an/slyt357/slyt357.pdf.*

International Search Report based on PCT/KR2007/005043, dated Jan. 29, 2008, 3 pgs.

* cited by examiner

*Primary Examiner* — Kenneth Douyette
(74) *Attorney, Agent, or Firm* — Lerner, David, Littenberg, Krumholz & Mentlik, LLP

(57) ABSTRACT

Disclosed herein is a battery system including two or more kinds of cell lines having different charge and discharge characteristics, wherein each cell line includes one or more battery cells connected in series with each other. In the battery system according to the present invention, the battery cells of at least one cell line exhibit a high-rate charge characteristic, whereas the battery cells of at least another cell line exhibit a high-rate discharge characteristic. Consequently, the high-rate charge and discharge characteristics are improved, and the balance between the charge and discharge characteristics is maintained, whereby the battery system according to the present invention is used as a power source having a high power.

20 Claims, No Drawings

HIGH POWER SECONDARY BATTERY SYSTEM COMPRISING ASYMMETRIC CHARGED CELLS

CROSS REFERENCE TO RELATED APPLICATIONS

The present application is a continuation of U.S. application Ser. No. 12/445,510, filed on Apr. 22, 2009, now abandoned which is a national phase entry under 35 U.S.C. §371 of International Application No. PCT/KR2007/005043, filed Oct. 16, 2007, published in English, which claims the benefit of Korean Patent Application No. 10-2006-0100095, filed Oct. 16, 2006. The disclosures of said applications are incorporated by reference herein.

FIELD OF THE INVENTION

The present invention relates to a high power secondary battery system including asymmetric charge cells, and, more particularly, to a battery system including two or more kinds of cell lines having different charge and discharge characteristics, wherein each cell line includes one or more battery cells connected in series with each other, and the battery cells of at least one cell line exhibit a high-rate charge characteristic, whereas the battery cells of at least another cell line exhibit a high-rate discharge characteristic, thereby providing a high power.

BACKGROUND OF THE INVENTION

In recent years, as mobile devices have been increasingly developed, and the demand of such mobile devices has increased, the demand of secondary batteries has also sharply increased as an energy source for the mobile devices. Among them is a lithium secondary battery having a high energy density and a high discharge voltage, on which much research has been carried out and which is now commercially and widely used.

Also, as concern about environmental problems has increased, much research has been carried out on electric vehicles and hybrid electric vehicles, which can replace existing vehicles, such as gasoline vehicles and diesel vehicles, using fossil fuel, which is one of the principal environmental pollution sources. A nickel-metal hydride secondary battery is mainly used as a power source for the electric vehicles and the hybrid electric vehicles. In recent years, however, the use of lithium secondary batteries, which have a high energy density and a high discharge voltage, as the power source for the electric vehicles and the hybrid electric vehicles has been attempted. Some of the lithium secondary batteries have now entered a commercialization stage.

The lithium secondary battery is constructed in a structure in which an electrode assembly, including cathodes each having an active material applied to its cathode current collector, anodes each having an active material applied to its anode current collector, porous separators disposed respectively between the cathodes and the anodes, is impregnated with a non-aqueous electrolyte including lithium salt. Lithium cobalt oxide, lithium manganese oxide, or lithium nickel oxide, or lithium composite oxide is used as the cathode active material. A carbon material is used as the anode active material.

A high-power, large-capacity battery system is required in order for the lithium secondary battery to be used as a power source for electric vehicles and hybrid electric vehicles. High-rate charge and discharge characteristics are required for such a high-power, large-capacity battery system.

For a hybrid electric vehicle, the operations of a battery system and an engine of the vehicle are changed depending upon the running conditions of the vehicle in order to minimize the use of fuel while improving the operation efficiency of the vehicle. For example, when the vehicle is running at a normal speed or running down an incline, the engine is not used, and the battery system is operated, whereby a high-rate discharge characteristic is required. When the vehicle is running in an accelerating fashion or running up an incline, the engine is mainly operated. In this case, kinetic energy is converted into electric energy, by which the battery system is charged, whereby a high-rate charge characteristic is required. Consequently, it is most ideal that both the charge characteristic and the discharge characteristic of the battery system are superior.

However, the charge characteristic and the discharge characteristic are complementary to each other. For this reason, when an electrode active material has a relatively superior charge characteristic, the electrode active material has a relatively inferior discharge characteristic. On the other hand, when an electrode active material has a relatively superior discharge characteristic, the electrode active material has a relatively inferior charge characteristic. For this reason, it is difficult for a secondary battery, including such electrode active materials, to exhibit a superior charge characteristic as well as a superior discharge characteristic. For example, lithium iron phosphorus oxide (an olivine compound) exhibits a charge characteristic superior to a discharge characteristic. Accordingly, a lithium secondary battery including the lithium iron phosphorus oxide as a cathode active material also exhibits a charge characteristic superior to a discharge characteristic. On the other hand, lithium titanium oxide (of a spinel crystal structure) exhibits a discharge characteristic superior to a charge characteristic. Accordingly, a lithium secondary battery including the lithium titanium oxide as a cathode active material also exhibits a discharge characteristic superior to a charge characteristic.

In conclusion, currently developed battery systems do not simultaneously exhibit a superior charge characteristic and a superior discharge characteristic. In this connection, lithium secondary batteries having different charge and discharge characteristics may simply combined to construct a battery system. However, it has been proven that such combination of the lithium secondary batteries provides a desired effect.

SUMMARY OF THE INVENTION

Therefore, the present invention has been made to solve the above problems, and other technical problems that have yet to be resolved.

Specifically, it is an object of the present invention to provide a high-power, large-capacity battery system that is capable of simultaneously exhibiting a high-rate charge characteristic and a high-rate discharge characteristic.

It is another object of the present invention to provide a battery system constructed in a structure in which battery cells having a high charge level and battery cells having a low charge level are used together in a specific combination, and the respective cell lines are charged with different charge levels, whereby the calendar life of the battery system is increased.

It is a further object of the present invention to provide a middle- or large-sized battery system constructed in a structure in which battery cells are used as unit bodies, and the battery system provides a desired power and capacity through the combination of the battery cells.

In accordance with the present invention, the above and other objects can be accomplished by the provision of a battery system including two or more kinds of cell lines having different charge and discharge characteristics, wherein each cell line includes one or more battery cells connected in series with each other, and at least one cell line exhibits a high-rate charge characteristic, whereas at least another cell line exhibits a high-rate discharge characteristic, when the battery system is operated.

Specifically, the battery system according to the present invention is constructed in a structure in which the battery cells, included in the respective cell lines, have different charge and discharge characteristics, and therefore, the battery cells are charged and discharged in an asymmetrical fashion for each cell line. Consequently, the charge and discharge characteristics of the battery system are improved, and, at the same time, the balance between the cell lines of the battery system is maintained, whereby the calendar life of the battery system is increased.

For example, when power is consumed from the battery system, the cell line exhibiting the high-rate charge characteristic complements the cell line exhibiting the high-rate discharge characteristic. Specifically, the battery cells of the cell line exhibiting the high-rate discharge characteristic are discharged, and then the battery cells of the cell line exhibiting the high-rate discharge characteristic are partially charged such that the balance between the battery cells of the cell line exhibiting the high-rate discharge characteristic and the battery cells of the cell line exhibiting the high-rate charge characteristic is maintained. When the battery cells of the battery system are charged, the process is carried out in reverse order. As a result, the charge and discharge characteristics of both the cell lines complement each other.

Generally, the battery system, which is used as a power source for facilities that are repetitively charged and discharged, is smoothly operated at a charge level of 30 to 70%. Consequently, when the overall operation condition of the battery system is established to a charge level of 30 to 70%, the battery cells of at least one cell line (hereinafter, referred to as a 'first cell line') are charged with a charge level higher than the overall charge of the battery system, whereas the battery cells of at least another cell line (hereinafter, referred to as a 'second cell line') are charged with a charge level lower than the overall charge of the battery system, whereby the charge and discharge characteristics of the cell lines complement each other, and therefore, the charge and discharge characteristics of the battery system are improved.

Especially for a hybrid electric vehicle, charge and discharge of the battery cells are repetitively carried out while the vehicle is running. For this reason, the battery system is preferably maintained at a charge level of approximately 50% such that the charge and discharge of the battery cells are frequently carried out depending upon the operation condition of the vehicle.

Consequently, when the overall operation condition of the battery system is established to a charge level of 50%, and the battery cells of at least one cell line are charged with a charge level of more than 55%, whereas the battery cells of at least another cell line are charged with a charge level of less than 45%, the charge and discharge characteristics of the cell lines complement each other, and therefore, the calendar life of the battery system is increased. Especially, the battery cells of the first cell line may be charged with a charge level of more than 60%, whereas the battery cells of the second cell line may be charged with a charge level of less than 40%.

In a preferred embodiment, the battery system is constructed such that the battery cells of the second cell line have an open circuit voltage at least 2.5% higher than that of the battery cells of the first cell line. In this case, battery cells having different charge and discharge characteristics are used for each cell line, and therefore, the charge and discharge characteristics of the first cell line are different from those of the second cell line, whereby the cell lines exhibit different open circuit voltages.

For example, when one battery cell is included in each cell line, and the battery cell of the first cell line uses $Li_4Ti_5O_{12}$ as an anode active material and a Li—Mn-spinel crystal structure as a cathode active material, the battery cell exhibits a potential difference of 2.5 V. On the other hand, when the battery cell of the second cell line uses hard carbon as the anode active material and $LiFePO_4$ as the cathode active material, the battery cell exhibits a potential difference of 3.5 V. In this case, when the battery system is charged with 3.0 V, the battery cell of the first cell line is completely charged, whereas the battery cell of the second cell line is completely discharged. Specifically, when the open circuit voltage difference is increased, the difference of the charge and discharged characteristics between the cell lines is increased, whereby both the charge characteristic and the discharge characteristic of the battery system are improved. Especially, it is preferable that the battery cells of the second cell line have an open circuit voltage at least 2.5% higher than that of the battery cells of the first cell line in order to optimally improve the charge and discharged characteristics.

In a preferred embodiment, the battery system includes two kinds of cell lines, and the battery cells of the first cell line have a relatively porous anode structure as compared with those of the second cell line, whereas the battery cells of the second cell line have a relatively porous cathode structure as compared with those of the first cell line.

Since the battery cells of one cell line have a relatively porous cathode or anode structure as compared with those of the other cell line, the surface area of the battery cells having the porous structures, which reacts with an electrolyte, is increased, and therefore, the charge and discharge characteristics of the battery cells are further improved. Specifically, the battery cells of the first cell line have the relatively porous anode structure, and therefore, an absorption speed of Li ions, discharged as the cathode active material, at which the Li ions are absorbed into the anode active material during the charge of the battery cells, is increased, whereby the charge characteristic of the battery cells is further improved. On the other hand, the battery cells of the second cell line have the relatively porous cathode structure, and therefore, an absorption speed of Li ions, at which the Li ions are absorbed into the cathode active material during the discharge of the battery cells, is increased, whereby the discharge characteristic of the battery cells is further improved.

In another preferred embodiment, the battery system includes two kinds of cell lines, the overall operation condition of the battery system is established to a charge level of 50%, and the battery cells of the first cell line have a charge pulse power greater than that of the battery cells of the second cell line at the above-specified operation condition, whereas the battery cells of the second cell line have a discharge pulse power greater than that of the battery cells of the first cell line at the above-specified operation condition.

Since the battery cells of the first cell line have a charge pulse power greater than that of the battery cells of the second cell line, the charge speed of the battery cells of the first cell line is increased. That is, the charge characteristic of the battery cell of the first cell line is further improved by increasing the charge pulse power of the battery cells of the first cell line exhibiting excellent high-rate discharge characteristic, with the result that selective charge is possible between both the cell lines. On the other hand, the battery cells of the second cell line have a discharge pulse power greater than that of the battery cells of the first cell line, and therefore, it is possible to selectively control the discharge order between both the cell lines.

The battery system according to the present invention preferably uses the following cathode and anode active materials.

Each battery cell of the first cell line includes doped or undoped lithium manganese oxide of a spinel crystal structure, doped or undoped lithium transition metal oxide of a layer crystal structure, or a mixture of the lithium manganese oxide and the lithium transition metal oxide as a major component of the cathode active material and lithium titanium oxide of a spinel crystal structure as a major component of the anode active material, and each battery cell of the second cell line includes lithium iron phosphorus oxide (an olivine compound) as a major component of the cathode active material and graphite, hard carbon, or a mixture thereof as a major component of the anode active material.

When the above-specified cathode and anode active materials are used, the first cell line exhibits a relatively high-rate charge characteristic, whereas the second cell line exhibits a relatively high-rate discharge characteristic.

Furthermore, the battery cells of the first cell line have a relatively long calendar life at a high charge level through the use of the above-specified cathode and anode active materials. On the other hand, the battery cells of the second cell line basically have a relatively long calendar life at a low charge level through the use of the above-specified cathode and anode active materials. Consequently, the calendar life of the battery system is increased.

Generally, the calendar life of a secondary battery is decreased due to the decomposition of an electrolyte through the repetitive charge and discharge of the secondary battery. Consequently, it is possible to restrain the decomposition of the electrolyte, and thus to increase the calendar life of the battery system, by establishing the battery system such that battery cells having a relatively low operation potential are charged first. The battery cells of the first cell line are charged first with a low operation potential, and therefore, the calendar life of the battery system is increased.

The "calendar life" means the life span of a secondary battery when the battery is maintained for a long period of time while the battery is in charge as well as the operation life of a secondary battery. Consequently, the calendar life is a comprehensive term.

The battery system according to the present invention may be manufactured by combining the battery cells or the cell lines depending upon a desired power and capacity. Preferably, the battery system is used in an electric vehicle, a hybrid electric vehicle, an electric motorcycle, or an electric bicycle, which has a limited installation space and requires a high-power, large-capacity battery system. Especially, when the battery system is frequently charged and discharged depending upon the operation condition thereof, such that the battery system is operated at a charge level of 30 to 70%, preferably 50%, the battery system is effectively used in a device, for example, a hybrid electric vehicle.

DETAILED DESCRIPTION OF PREFERRED EMBODIMENTS

Now, the present invention will be described in more detail with reference to the following examples. These examples are provided only for illustrating the present invention and should not be construed as limiting the scope and spirit of the present invention.

Example 1

A battery system including two cell lines was manufactured.

For the first cell line, lithium battery cells were manufactured using $Li_4Ti_5O_{12}$ as a major component of an anode active material and lithium manganese oxide of a spinel crystal structure as a major component of a cathode active material. Also, the lithium battery cells were constructed such that the charge capacity of the anode active material was less than that of the cathode active material. For the second cell line, on the other hand, lithium battery cells were manufactured using lithium iron phosphorus oxide (of an olivine crystal structure) as a major component of a cathode active material and hard carbon as a major component of an anode active material.

Available capacities of the two kinds of battery cells were established such that the available capacities of the two kinds of battery cells were almost equal to each other. The two cell lines were connected in parallel with each other to construct the whole secondary battery system.

As a result, the operation voltage of the battery system was 2.6 V. At the operation voltage of the battery system at a charge level of 50%, the battery cells of the first cell line were completely charged, whereas the battery cells of the second cell line were completely discharged.

Example 2

A battery system including two cell lines was manufactured. The first cell line was constructed using five battery cells connected in series with each other, whereas the second cell line was constructed using four battery cells connected in series with each other.

For the first cell line, the battery cells (lithium battery cells) were manufactured using $Li_4Ti_5O_{12}$ as a major component of an anode active material and lithium manganese oxide of a spinel crystal structure as a major component of a cathode active material. For the second cell line, on the other hand, the battery cells (lithium battery cells) were manufactured using lithium iron phosphorus oxide (an olivine compound) as a major component of a cathode active material and carbon (a mixture of graphite and hard carbon) as a major component of an anode active material.

Available capacities of the two kinds of battery cells were established such that the available capacities of the two kinds of battery cells were almost equal to each other. The two cell lines were connected in parallel with each other to construct the whole secondary battery system.

As a result, the operation voltage of the battery system was 12.7 V. At the operation voltage of the battery system at a charge level of 50%, the battery cells of the first cell line were charged with at least 70% of a charge level, whereas the battery cells of the second cell line were charged with less than 30% of the charge level.

Example 3

A battery system including two cell lines was manufactured. The first cell line was constructed using 10 battery cells connected in series with each other, whereas the second cell line was constructed using 11 battery cells connected in series with each other.

The battery cells of the first cell line were established such that the battery cells of the first cell line exhibit a high-rate discharge characteristic, and had a long calendar life at a high charge level. Specifically, the battery cells of the first cell line were manufactured using graphite as an anode active material and lithium transition oxide of a spinel crystal structure as a cathode active material.

The battery cells of the second cell line were established such that the battery cells of the second cell line exhibit a high-rate charge characteristic, and had a long calendar life at a low charge level. Specifically, the battery cells of the second cell line were manufactured using hard carbon as an anode active material and $LiNiO_2$ as a cathode active material.

As a result, the operation voltage of the battery system was 40 V. At the operation voltage of the battery system in a charge level of 50%, the battery cells of the first cell line were charged with at least 60% of a charge level, whereas the battery cells of the second cell line were charged with less than 40% of the charge level.

Example 4

A battery system including two cell lines was manufactured. The first cell line was constructed using a plurality of battery cells connected in series with each other, and the second cell line was constructed using the same number of battery cells as the first cell line, connected in series with each other. For both the first cell line and the second cell line, the battery cells were manufactured using the same cathode active material and the same anode active material. Specifically, $LiMO_2$ (M=Mn—Ni—Co) of a spinel crystal structure was used as a cathode active material, and a mixture of graphite and hard carbon was used as an anode active material.

In order for the two cell lines to have different charge and discharge characteristics, however, the battery cells of the first cell line were established such that rapid discharge was possible for the battery cells of the first cell line, whereas the battery cells of the second cell line were established such that rapid charge was possible for the battery cells of the second cell line. Especially, the pores (filled with an electrolyte) of the cathode and anode active materials were designed in an asymmetric fashion to reduce an electrolyte decrease effect. For the battery cells of the first cell line, therefore, the porosity of the cathode active material was greater than that of the anode active material, whereby the first cell line exhibited a more rapid discharge characteristic. For the battery cells of the second cell line, on the other hand, the porosity of the anode active material was greater than that of the cathode active material, whereby the second cell line exhibited a more rapid charge characteristic.

As a result, while the battery system was in a charge level of 50%, the battery cells of the first cell line were charged with more than 55% of a charge level, whereas the battery cells of the second cell line were charged with less than 45% of the charge level. This result revealed that the charge or discharge characteristic of the battery cells could be changed by the change in capacity of the electrodes as well as the change in composition of the cathode and anode active materials of the respective battery cells.

Comparative Example 1

A battery system including two cell lines was manufactured. The first cell line was constructed using five battery cells connected in series with each other. Also, the second cell line was constructed using five battery cells connected in series with each other.

The battery cells of the first and second cell lines were established such that the battery cells of the first and second cell lines had the same charge and discharge characteristics. Specifically, the battery cells of the first and second cell lines were manufactured using the same cathode active material and the same anode active material. Also, the battery cells of the first and second cell lines were constructed in the same structure.

As a result, the operation voltage of the battery system was 40 V. At the operation voltage of the battery system in a charge level of 50%, all the battery cells of the first and second cell lines were charged with 50% of the charge level.

Experimental Example 1

While the battery systems manufactured according to Example 1 to Example 4 and Comparative example 1 were at a charge of 50%, the battery systems were charged and discharged with a predetermined current for 10 seconds to measure power of the respective battery systems.

TABLE 1

|  | Example 1 | Example 2 | Example 3 | Example 4 | Comparative example 1 |
|---|---|---|---|---|---|
| Charge power (%) | 130% | 126% | 120% | 110% | 100% |
| Discharge power (%) | 120% | 120% | 115% | 108% | 100% |

As can be seen from Table 1 above, it was confirmed that both the charge and discharge characteristics of the battery systems manufactured according to Example 1 to Example 4 were increased as compared to those of the battery system manufactured according to Comparative example 1. Specifically, when the battery system was constructed such that the cell lines of the battery system had different charge and discharge characteristics, the battery cells are charged and discharged in an asymmetrical fashion for each cell line, and therefore, the cell lines complemented each other. As a result, the balance between the cell lines of the battery system was maintained while the charge and discharge characteristics of the battery system were improved.

INDUSTRIAL APPLICABILITY

As apparent from the above description, the secondary battery system is constructed such that the respective cell lines have different charge and discharge characteristics. Consequently, the present invention has the effect of maintaining the balance between the charge characteristic and the discharge characteristic of the entire battery system, and, at the same time, improving both the charge and discharge characteristics and increasing the calendar life of the secondary battery system. Furthermore, the battery cells are combined as unit bodies of the battery system to provide a battery system having a desired power and capacity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A battery system including two or more kinds of cell lines having different charge and discharge characteristics, wherein the two or more kinds of cell lines are connected in parallel with each other, each of said two or more kinds of cell lines includes one or more battery cells connected in series with each other, and wherein the battery system is constructed such that, when the battery system is operated, a first cell line of said two or more kinds of cell lines exhibits a high-rate charge characteristic, whereas a second cell line of said two or more kinds of cell lines exhibits a high-rate discharge characteristic, wherein said high-rate charge characteristic complements said high-rate discharge characteristic, whereby, when power is consumed from the battery system, the one or more battery cells of the second cell line are discharged, and then the one or more battery cells of the second cell line are partially charged such that a balance between the one or more battery cells of the second cell line and the one or more battery cells of the first cell line is maintained.

2. The battery system according to claim 1, wherein
an overall operation condition of the battery system is established to an overall charge level of 30 to 70%, and
the one or more battery cells of the first cell line of said two or more kinds of cell lines are charged with a first charge level higher than the overall charge level of the battery system, whereas the one or more battery cells of the second cell line of said two or more kinds of cell lines are charged with a second charge level lower than the overall charge level of the battery system.

3. The battery system according to claim 2, wherein
the overall operation condition of the battery system is established such that the overall charge level is 50%, and
the first charge level is more than 55%, whereas second charge level is less than 45%.

4. The battery system according to claim 3, wherein
the first charge level is more than 60%, and
the second charge level is less than 40%.

5. The battery system according to claim 1, wherein
an overall operation condition of the battery system is established to an overall charge level of 50%, and
the one or more battery cells of the second cell line of said two or more kinds of cell lines have an open circuit voltage at least 5% higher than that of the one or more battery cells of the first cell line of said two or more kinds of cell lines.

6. The battery system according to claim 1, wherein
the one or more battery cells of the first cell line of said two or more kinds of cell lines have a relatively porous anode structure as compared with the one or more battery cells of the second cell line of said two or more kinds of cell lines, whereas the one or more battery cells of the second cell line have a relatively porous cathode structure as compared with the one or more battery cells of the first cell line.

7. The battery system according to claim 1, wherein
an overall operation condition of the battery system is established to an overall charge level of 50%, and
the one or more battery cells of the first cell line of said two or more kinds of cell lines have a charge pulse power greater than that of the one or more battery cells of the second cell line of said two or more kinds of cell lines at said overall operation condition, whereas the one or more battery cells of the second cell line have a discharge pulse power greater than that of the one or more battery cells of the first cell line at said overall operation condition.

8. The battery system according to claim 1, wherein
each battery cell of the first cell line of said two or more kinds of cell lines includes doped or undoped lithium manganese oxide of a spinel crystal structure, doped or undoped lithium transition metal oxide of a layer crystal structure, or a mixture of the lithium manganese oxide and the lithium transition metal oxide as a major component of a cathode active material and lithium titanium oxide of a spinel crystal structure as a major component of an anode active material, and each battery cell of the second cell line of said two or more kinds of cell lines includes lithium iron phosphorus oxide as a major component of a cathode active material and graphite, hard carbon, or a mixture thereof as a major component of an anode active material.

9. An electric vehicle comprising the battery system according to claim 1 as a power source.

10. The battery system according to claim 1, wherein the battery system is frequently charged and discharged depending upon an operation condition thereof, whereby the battery system is operated at a charge level of 30 to 70%.

11. A hybrid electric vehicle comprising the battery system according to claim 1 as a power source.

12. A battery system including two or more kinds of cell lines having different charge and discharge characteristics, wherein
the two or more kinds of cell lines are connected in parallel with each other,
each of said two or more kinds of cell lines includes one or more battery cells connected in series with each other,
wherein the battery system is constructed such that a first cell line of said two or more kinds of cell lines exhibits a high-rate charge characteristic, whereas a second cell line of said two or more kinds of cell lines exhibits a high-rate discharge characteristic, when the battery system is operated, and
wherein an overall operation condition of the battery system is established to an overall charge level of 50%, and
the one or more battery cells of the first cell line of said two or more kinds of cell lines are charged with a first charge level of more than 55%, whereas the one or more battery cells of the second cell line of said two or more kinds of cell lines are charged with a second charge level of less than 45%.

13. The battery system according to claim 12, wherein
the first charge level is more than 60%, and
the second charge level is less than 40%.

14. The battery system according to claim 12, wherein
the one or more battery cells of the second cell line of said two or more kinds of cell lines have an open circuit voltage at least 5% higher than that of the one or more battery cells of the first cell line of said two or more kinds of cell lines.

15. The battery system according to claim 12, wherein
the one or more battery cells of the first cell line of said two or more kinds of cell lines have a relatively porous anode structure as compared with the one or more battery cells of the second cell line of said two or more kinds of cell lines, whereas the one or more battery cells of the second cell line have a relatively porous cathode structure as compared with the one or more battery cells of the first cell line.

16. The battery system according to claim 12, wherein
the one or more battery cells of the first cell line of said two or more kinds of cell lines have a charge pulse power greater than that of the one or more battery cells of the second cell line of said two or more kinds of cell lines at said overall operation condition, whereas the one or more battery cells of the second cell line have a discharge pulse power greater than that of the one or more battery cells of the first cell line at said overall operation condition.

17. The battery system according to claim 12, wherein
each battery cell of the first cell line of said two or more kinds of cell lines includes doped or undoped lithium manganese oxide of a spinel crystal structure, doped or undoped lithium transition metal oxide of a layer crystal structure, or a mixture of the lithium manganese oxide and the lithium transition metal oxide as a major component of a cathode active material and lithium titanium oxide of a spinel crystal structure as a major component of an anode active material, and
each battery cell of the second cell line of said two or more kinds of cell lines includes lithium iron phosphorus oxide as a major component of a cathode active material and graphite, hard carbon, or a mixture thereof as a major component of an anode active material.

18. An electric vehicle comprising the battery system according to claim 12 as a power source.

19. The battery system according to claim 12, wherein the battery system is frequently charged and discharged depending upon an operation condition thereof.

20. A hybrid electric vehicle comprising the battery system according to claim 12 as a power source.

* * * * *